UNITED STATES PATENT OFFICE.

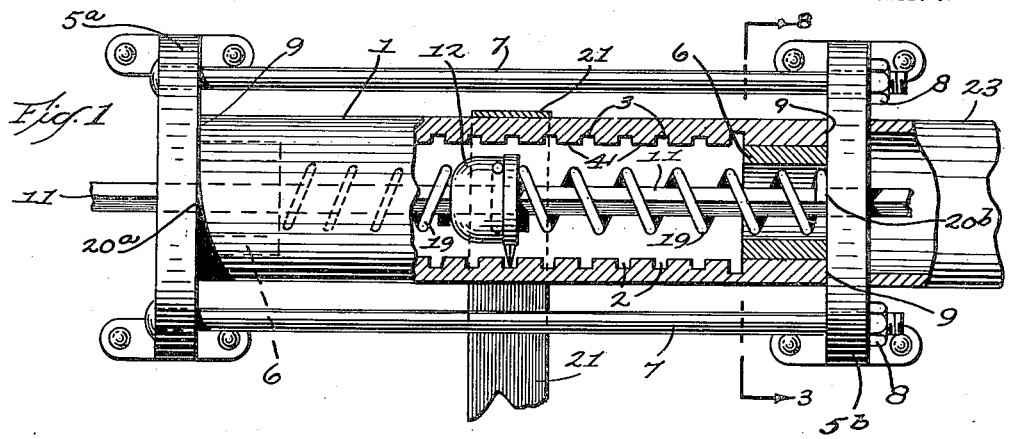
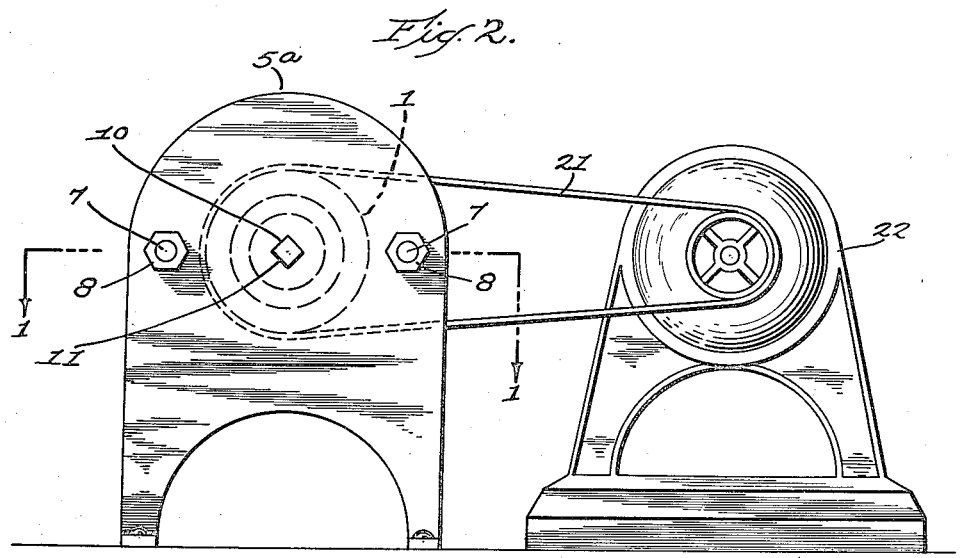
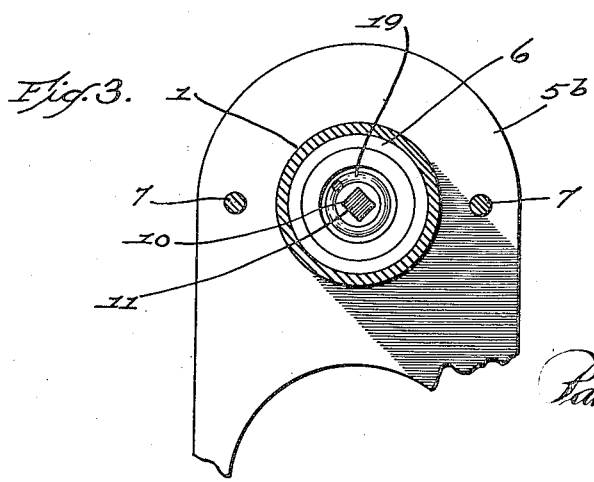

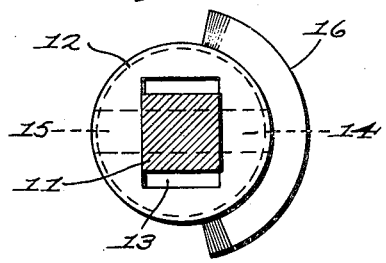
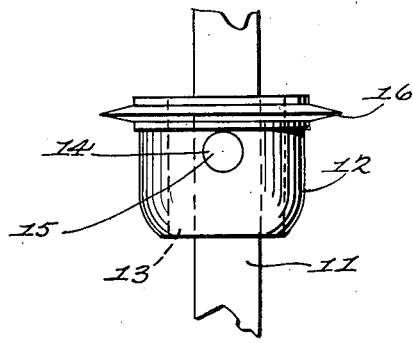
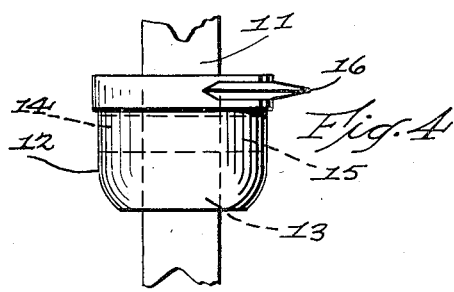
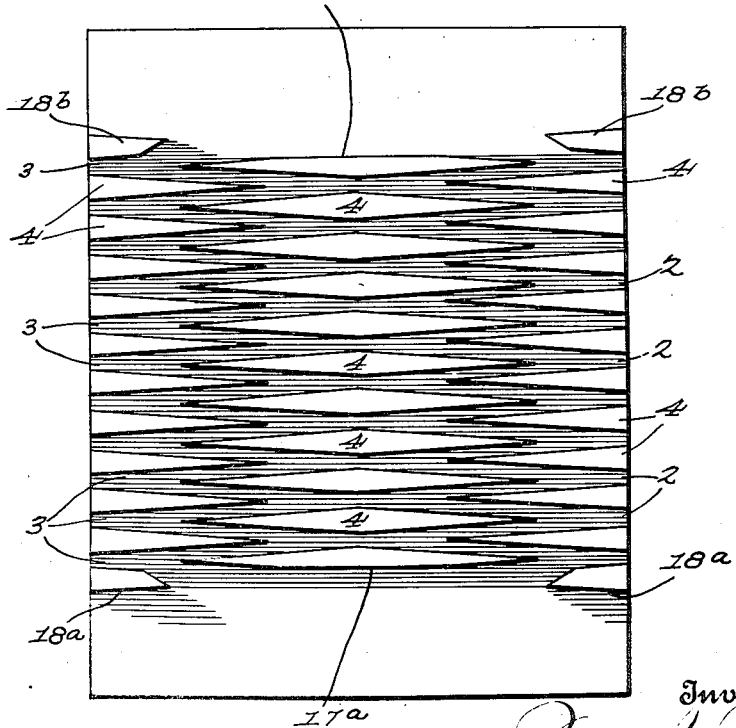

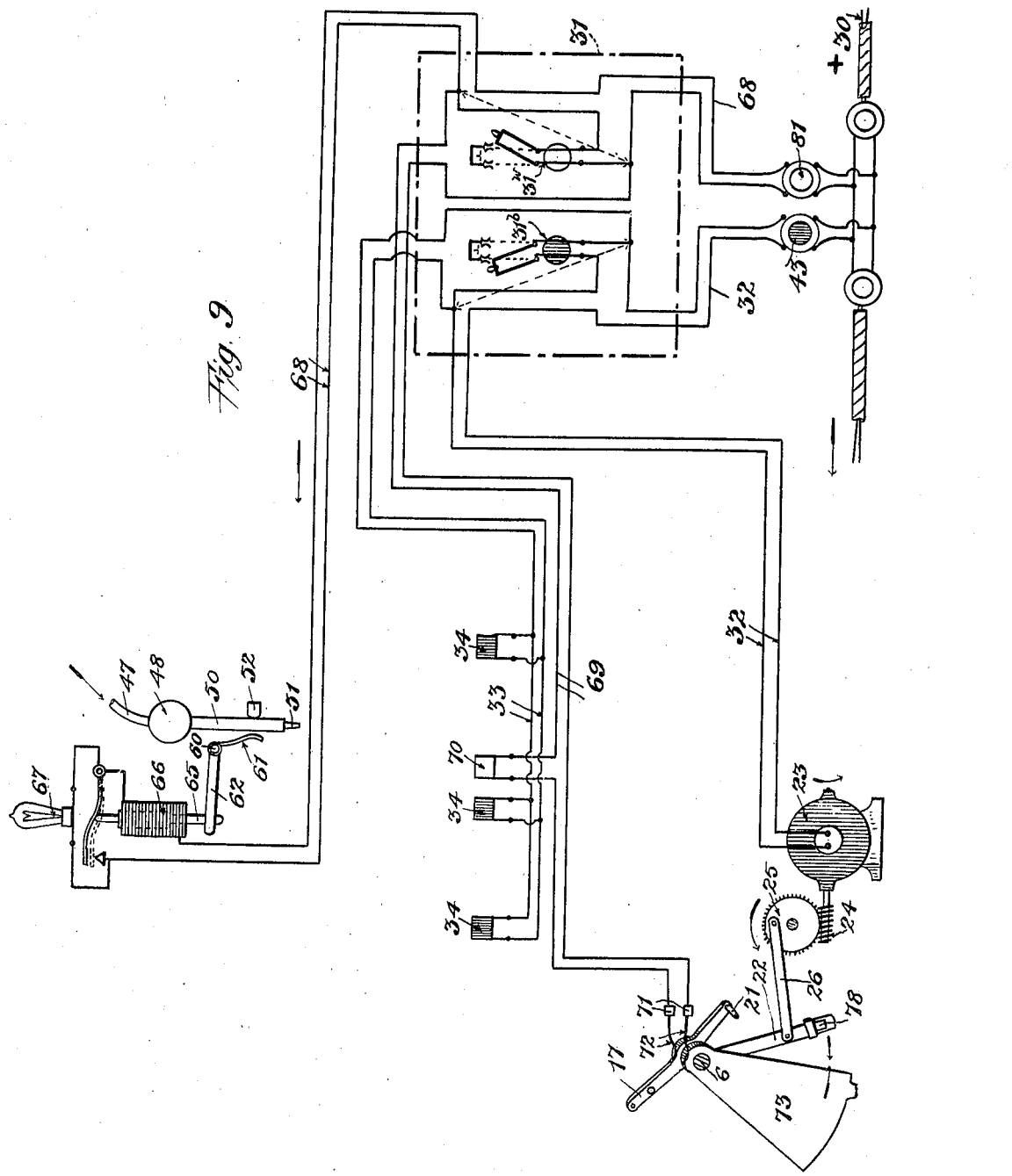

PATRICK J. ROONEY, OF NEW ROCHELLE, NEW YORK.

POWER-TRANSMISSION APPLIANCE.

1,415,120. Specification of Letters Patent. Patented May 9, 1922.

Application filed June 7, 1921. Serial No. 475,601.

*To all whom it may concern:*

Be it known that I, PATRICK J. ROONEY, a citizen of the United States, and resident of 106 Clove Road, city of New Rochelle, in the county of Westchester and State of New York, have invented certain new and useful Improvements in Power-Transmission Appliances, of which the following is a specification.

In my application for a patent for a power transmission appliance for pumps and compressors upon which Letters Patent of the United States were granted to me on the 5th day of April. 1921, bearing Serial No. 1,373,764, I have described an appliance by which the high speed rotary motion of an electric motor or gas engine may be converted into slow speed reciprocating motion suitable to pumps, compressors or other instruments without the use of gears, pitman rods, crank shafts or other similar types of mechanisms theretofore in use to accomplish such reduction of speed and the conversion of rotary into reciprocating motion.

The present application is intended to cover broadly a power transmission appliance based upon the same generic idea but presenting certain advantages in the separate features of construction; the various improvements in detail being defined in the claims hereinafter contained and described in detail in connection with the embodiment of the invention illustrated in the accompanying drawings in which—

Fig. 1 is a top view taken on the line 1—1 of Fig. 2 and shows a rotatable cylinder mounted upon stationary supports and indicates partly in section the mechanism enclosed in such cylinder, also a belt for connecting a rotary motor to such cylinder and also a pump cylinder partly in broken section attached to one of the support blocks for the cylinder, Fig. 2 is an end elevational view showing a rotary motor connected by a belt to my power transmission appliance, Fig. 3 is a view taken on the line marked 3—3 of Fig. 1, Fig. 4 is an enlarged side view of the follower in the form of a collar, with a rib projecting therefrom, mounted on the reciprocating shaft, Fig. 5 is a top plan view of the same parts of the mechanism illustrated in Fig. 4, Fig. 6 is a side elevational view of the same mechanism shown in Fig. 4 taken from a point of view in front of the central part of the rib, Fig. 7 is a development on a plane of my improved system of helical grooves and switches such that if this plane were wrapped about the inside of the hollow cylinder illustrated in Fig. 1, so that its ends met perfectly, it would then show the proper location and relative dimensions of my improved system of helical grooves and switches, it being understood that the shaded surfaces represent the grooves and the unshaded surfaces represent the original surfaces of the cylinder in which they are cut. This figure also shows bearing surfaces at both ends of the cylinder for mounting upon the block supports.

The improvements upon my previous structure illustrated in the above drawings consist of 1. The use of only one follower instead of two, without any unbalanced thrust.
2. The use of only one right-handed and one left-handed thread or helical groove instead of two, thereby accomplishing an improved effect with a fewer number of parts.
3. To provide an improved type of follower which, while pivotally mounted and free to swing in one direction or plane so as to accommodate itself to the threads of the cylinder which move first in one direction and then in another, will be prevented from getting in the least out of line in any other direction, which is a very vital necessity in this apparatus.
4. To provide an improved and novel type of switch.
5. To provide for absorbing the momentum of the reciprocating shaft as it reaches the end of one stroke and to utilize the energy thus absorbed to start the shaft at the beginning of its opposite stroke at full speed, by means of the use of the springs illustrated.
6. To simplify the supports and bearings for the cylinder and combine therewith the necessary guide to prevent the rotation of the reciprocating shaft, and
7. To reduce the manufacturing cost of my power transmission appliance.

Referring to the drawings which illustrate the above improvements, a hollow cylinder (1) comprising one right-handed thread (2) and one left-handed cross-thread (3), each of which threads make several turns about the interior of the cylinder leaving therein the diamond shaped elevations (4) illustrated, is mounted on two supporting blocks (5ª—5ᵇ), each of which has a boss or hub (6) projecting inwardly into the cylinder ends so as to permit the cylinder to rotate upon the said bosses while at the same time the said supporting blocks are mounted in close relationship to the ends of the cylinder by means of rods (7) with adjusting nuts (8) on the ends thereof, thereby providing adjustable thrust bearings consisting of the flat surfaces of the support blocks adjacent to the bosses which are inwardly presented towards and contact with the end surfaces of the cylinder, and these thrust bearings (9) are adjustable for wear by means of taking up on the nuts (8) on the rods aforesaid. These support blocks each have a squared hole therethrough (10) in the line corresponding to an extension of the axis of rotation of the cylinder, which squared holes are adapted to contain the reciprocating shaft (11) of this apparatus which slides longitudinally through the squared holes while being held in a line corresponding to the axis of rotation of the cylinder so mounted upon the bosses which compose an integral part of the supporting blocks before mentioned. The reciprocating shaft is squared on each side of the follower for a distance corresponding to the amplitude of reciprocation thereof and snugly fits the squared holes in the support blocks, as a result whereof these squared holes serve not only as a bearing support for the reciprocating shaft, but also as shaft guides by preventing the rotation of the shaft which would otherwise result when the cylinder with its grooves in which the follower fits, is rotated.

The follower (12) consists of a metal segment provided with a rectangular hole (13) therethrough for the reciprocating shaft (11) and also with a hole (14) for a supporting pin (15) running therethrough at right angles to the reciprocating shaft by means of which two holes the follower may be slipped over the reciprocating shaft and pivotally pinned thereto and supported thereupon in such manner that while the follower may move freely in a plane at right angles to the supporting pin, it will be prevented from moving in any other plane by the combined action of the supporting pin and the contact of the squared surfaces of the hole through the follower and the squared surfaces of the reciprocating shaft in contact with the follower; it is important that the follower snugly fit the shaft and that the hole through the follower be rectangular rather than square owing to the necessity of extending the hole on both sides of the shaft so as to permit the follower to move in an arc about the pivot pin and thereby to accommodate itself to the change in slope when the follower leaves the groove of one direction and enters the groove of opposite direction. The rib (16) of the follower projects therefrom around a part of the outer circumference thereof on a plane parallel to the plane of the hole for the supporting pin therein and this rib is shaped so as to correspond to the width, depth and curvature of the threads in the cylinder. The follower and the rib may be formed out of one piece of metal or the rib may be made separately and fastened to the body of the follower.

The novelty of my improved switching mechanism consists in cutting back a part of the diamond shaped elevations at each end of the cylinder as shown by points marked 17$^a$ and 17$^b$ in Fig. 7, thus eliminating the excessive play allowed to the rib of the follower by the widening of the grooves at the end of each stroke as in my old mechanism and also providing for an improved action by reason of the fact that owing to the cutting back of these diamonds at the end of each stroke, the follower can straighten itself out to an extent approximately bringing it into a plane normal to the axis of rotation of the cylinder before the points of the rib of the follower strike the switches, whereby the switches have only to move the follower by contact half the distance that they move the follower in the old style of switches thereby eliminating shock and impact and making a smoother action as well as eliminating the impact caused by the motion of the follower through the widened grooves at the end of each stoke, all of which resulted from the momentum of the reciprocating shaft in the old style of construction. This improvement therefore automatically straightens out the follower to an extent corresponding to one-half of the pitch angle of the threads before the point of the rib comes in contact with the switch (18$^a$ and 18$^b$).

The springs (19) also help to eliminate any jar or slap due to the impact of the follower rib against the points of the switches and these springs are mounted about the shaft either inside or outside of the cylinder in any appropriate place so that at the end of each stroke of the shaft the springs will be compressed, thus absorbing the energy of the momentum of the shaft and the thereunto attached follower and thus also giving back the energy of momentum so absorbed by starting the shaft and the follower back in the opposite direction when the rib of the follower leaves the thread of one direction and passes into the thread of opposite direction in the cylinder.

It is found in practice that this mechanism functions practically where springs are used without other switches and also where switches are used without the springs. In the first combination, the ribbed follower is allowed to run into the open part of the cylinder beyond the threads, whereupon the springs press the shaft and follower back until by the back contact of the follower rib with the rocking point of the most proximate diamond, the rib is directed into the proper groove, and in the other combination the change of direction is accomplished by the switches without the springs, but in practice the use of the springs will be found advantageous even with the switches to give a smoother turning over at the end of each stroke and to prevent the extra load put upon a motor by the sudden arrest of motion of the shaft and the sudden acceleration thereof in the opposite direction of reciprocation.

These springs, as illustrated, are disposed about the shaft on both sides of the follower and bear respectively against the inner surfaces of the supporting blocks at the points marked 20ª and 20ᵇ, but they may be placed elsewhere if so desired.

The cylinder is shown operated by a belt (21) about its outer circumference and driven by a motor (22) but other driving systems may be used including direct drive be means of a hollow shaft superimposed about the reciprocating shaft and passing through the support block which furnishes a bearing therefor, in which event only one squared shaft bearing is used and this will necessarily be on the opposite end of the cylinder from that where the driving hollow shaft system is connected. A pump cylinder is shown at 23.

Another embodiment of my combination heretofore patented and to which my present improvements are all applicable comprises a solid cylinder or shaft with the helical grooves wound about the exterior surface of such cylinder which is rotatably supported parallel to the pump shaft upon which the ribbed follower is mounted so as to slide through the said grooves. The only difference being that the metal segment, of which the follower consists, is concave in the part from which the rib projects instead of being convex as illustrated, but the follower is provided with a similar shaft hole and is similarly mounted upon the pump shaft by means of pivot pin or cross bar. In such an embodiment it is preferable to use a box for the entire mechanism with bearings for the rotating shaft, and with squared guide bearings for the pump shaft therein all running in a bath of oil.

Ball or roller bearings may be used at the points marked 9 instead of the plain thrust bearings illustrated.

Various modifications may be made in my invention and I do not confine myself to the particular embodiment illustrated.

I claim:

1. In a power transmission appliance in combination, a hollow cylinder with a plurality of turns of one right-handed thread and a plurality of turns of one left-handed thread in the inner surface of such cylinder, leaving diamond shaped elevations between the said threads, a ribbed follower adapted to seat in the said threads, a shaft to be reciprocated, means for connecting the said shaft to the said ribbed follower, means for preventing the rotation of the said ribbed follower and the said shaft to be reciprocated, means for changing the direction of slope of the said ribbed follower at the point of departure thereof from a thread of one direction and of entry into a thread of opposite direction, bearings for the said rotating cylinder and reciprocating shaft and lubricating means therefor, substantially as described.

2. In a power transmission appliance for pumps and compressors in combination, a hollow cylinder with a plurality of turns of one right-handed thread and a plurality of turns of one left-handed thread in the inner surface of such cylinder leaving diamond shaped elevations between the said threads, a ribbed follower adapted to seat in the said threads, a shaft to be reciprocated, means for connecting the said shaft to the said ribbed follower, means for preventing the rotation of the said ribbed follower and the said shaft to be reciprocated, means for changing the direction of slope of the said ribbed follower at the point of departure thereof from a thread of one direction and of entry into a thread of opposite direction, means for rotating the said cylinder, connective means between the said reciprocating shaft and the pump shaft, bearings for the said rotating cylinder and the reciprocating shaft and lubricating means therefor substantially as described.

3. In a power transmission appliance, a cylinder with two helical grooves therein sloping in opposite directions and leaving diamond shaped elevations between the said threads, a ribbed follower adapted to seat in the said threads, a shaft to be reciprocated, means for connecting the said shaft to the said ribbed follower, means for preventing the rotation of the said ribbed follower and the said shaft to be reciprocated, means for changing the direction of slope of the said ribbed follower at the point of departure thereof from a thread of one direction and of entry into a thread of opposite direction, means for rotating the said cylinder, connective means between the said reciprocating shaft and the instrument to be operated, bearings for the said rotating cylinder and the reciprocating shaft and lubricating means therefor substantially as described.

4. In a power transmission appliance for pumps and compressors in combination, a pump shaft, a cylinder with two helical grooves therein sloping in opposite directions and leaving diamond shaped elevations between the said threads, a ribbed follower adapted to seat in the said threads, a shaft to be reciprocated, means for connecting the said shaft to the said ribbed follower, means for preventing the rotation of the said ribbed follower and the said shaft to be reciprocated, means for changing the direction of slope of the said ribbed follower at the point of departure thereof from a thread of one direction and of entry into a thread of opposite direction, means for rotating the said cylinder, connective means between the said reciprocating shaft and the instrument to be operated, bearings for the said rotating cylinder and the reciprocating shaft and lubricating means therefor substantially as described.

5. In power transmission appliance the combination of a shaft to be reciprocated, a guide for preventing the rotation while permitting the reciprocation of the said shaft, a follower pivotally and otherwise fixedly mounted upon the said shaft, a cylinder comprising helical grooves therein sloping in opposite directions and therewith connected switching mechanisms, supports and bearings for the said cylinder and the reciprocating shaft and means for rotating the said cylinder, whereby, when the said cylinder is rotated, the reciprocating shaft will be prevented from rotating and will, as a result thereof, be reciprocated fully in both directions.

6. In a power transmission appliance for pumps and compressors the combination of a pump shaft, a follower pivotally and otherwise fixedly mounted thereupon, a guide for preventing the rotation while permitting the reciprocation of the said shaft and follower, a cylinder comprising one right-handed and one left-handed thread winding for a number of turns about the said cylinder leaving therein diamond shaped or rhomboid elevations between the said threads and therewith connected switching mechanisms, a rib fixedly attached to the said follower and adapted to be seated in the said threads, supports and bearings for the said cylinder and the reciprocating shaft and means for rotating the said cylinder, whereby when the said cylinder is rotated the pump shaft will be prevented from rotating and will, as a result thereof, be reciprocated fully in both directions.

7. In a power transmission appliance in combination, a hollow cylinder embodying on the inside thereof a plurality of turns of one right-handed and one left-handed thread, each sloping in an opposite direction and each beginning where the other ends and ending where the other begins, a follower comprising a metal segment perforated centrally so as to contain a shaft to be reciprocated, and also bored at approximately right angles to the shaft hole for a pivot pin, a pivot pin pivotally mounting said follower upon the said reciprocating shaft, a rib extending partly around the periphery of the said follower and adapted to seat in the threads of the said cylinder and corresponding in width, depth and curvature with the said threads and with the anterior point of the said rib sharpened, switches consisting of promontory shaped extensions at the point of change of direction of the threads and adapted to come into contact with the anterior edge of the rib and thereby to change the direction of slope of the follower and to direct the same into a thread of opposite slope to that which it is leaving, a cutting back of the thickness of the diamond shaped elevation at the point where the right and left-handed threads meet and where the follower changes its slope, springs for absorbing the momentum of the reciprocating shaft at the end of each stroke and for imparting motion in the opposite direction by a release of the energy of the spring as the follower enters the thread of new direction at the begining of each stroke, a combined bearing and shaft guide for the shaft to be reciprocated permitting the reciprocation of the shaft while preventing the rotation thereof, bearings for the said rotating cylinder and the said reciprocating shaft and means for rotating the said cylinder, substantially as described.

8. In a power transmission appliance the combination of a shaft to be reciprocated, a follower pivotally and otherwise fixedly mounted thereupon, a guide for preventing the rotation while permitting the reciprocation of the said shaft and follower, a cylinder comprising one right-handed and one left-handed thread, winding for a number of turns about the said cylinder leaving therein diamond shaped or rhomboid elevations between the said threads and therewith connected switching mechanisms, a rib fixedly attached to the said follower and adapted to be seated in the said threads, supports and bearings for the cylinder and the reciprocating shaft and means for rotating the said cylinder, whereby when the said cylinder is rotated the pump shaft will be prevented from rotating and will, as a result thereof, be reciprocated fully in both directions.

9. In a mechanism of the character described, the combination of a reciprocating pump, a shaft extending therefrom, a shaft guide, a revolvable cylinder comprising therein a plurality of helical cam surfaces sloping in opposite directions, and therewith connected switching mechanisms, a ribbed follower adapted to co-act with the helical cam surfaces, connective means between the follower and the shaft to be reciprocated, a rotary motor and connective means between the said rotary motor and the said cylinder, substantially as described.

10. In a power transmission appliance, a hollow cylinder having one right and one left-handed thread in the interior surface thereof with rhomboid elevations between the said threads, a reciprocating shaft, a ribbed follower pivotally mounted thereon, a shaft guide for permitting the reciprocation while preventing the rotation of the reciprocating shaft, bearings and supports for the said hollow cylinder and the said reciprocating shaft and switching means for changing the direction of the ribbed follower from a thread of one direction to a thread of the opposite direction, substantially as illustrated.

11. In a power transmission appliance comprising a rotatable cylinder with right and left-handed cross threads in the surface thereof, suitable switching mechanisms, a shaft to be reciprocated, a shaft guide, bearings and supports for the said rotating cylinder and the reciprocating shaft, a ribbed follower mounted upon the reciprocating shaft and adapted to slide through the said grooves by the rotation of the said cylinder, spring operated means for absorbing the momentum of the reciprocating shaft and therewith connected mechanisms as the said ribbed follower leaves a thread of one direction at the end of the stroke of the shaft and for returning to the said shaft and attached mechanisms the energy thus absorbed by imparting motion to the said shaft and attached mechanisms in the opposite direction of reciprocation as the follower enters the threads of new direction without the necessity of other switches to accomplish the change of direction of the follower, all substantially as illustrated.

12. In a power transmission appliance, a follower comprising a metal segment with a shaft hole therethrough, adapted to snugly fit a shaft on two of its sides and loosely fit the shaft on its other two sides, a rib projecting from the said follower and adapted to slide through grooves, a pin for pivotally mounting the said follower upon the said reciprocating shaft and an appropriate recess therefor in the said follower, a reciprocating shaft extending through the said hole in the said follower, a rotatable cylinder comprising right and left-handed threads in the surface thereof, a shaft guide for permitting the reciprocation while preventing the rotation of the reciprocating shaft, bearings and supports for the said hollow cylinder and the said reciprocating shaft, and switching means for changing the direction of the ribbed follower from the groove of one direction to the groove of opposite direction, substantially as described.

13. In a power transmission appliance a reciprocating shaft squared where it passes through a square bearing by which the said shaft is supported and which prevents the rotation of the said shaft while permitting the reciprocation thereof, a ribbed follower pivotally mounted upon the said shaft and adapted to co-act with a rotating cylinder comprising left and right-handed threads therein through which the rib of the said follower slides, bearings and supports for the said hollow cylinder and the said reciprocating shaft, and switching means for changing the direction of the ribbed follower from the groove of one direction to the groove of opposite direction, substantially as illustrated.

14. In a power transmission appliance of the character described, a cylinder comprising right and left-handed threads therein leaving rhomboid shaped elevations between the threads, a diminution in thickness of the outer rhomboid shaped elevations at each end of the threaded portion of the cylinder at the point where the threads of opposite slope meet and join each other, whereby when the follower passes through the threads it may gradually change its direction from one thread to the other by being slid along such cut back surface as it passes from one thread to the other, in combination with a shaft to be reciprocated, an appropriate ribbed follower mounted thereon, bearings and supports for the said cylinder and the said reciprocating shaft and guides for permitting the reciprocation while preventing the rotation of the said reciprocating shaft, substantially as described.

15. In a power transmission appliance of the character described, a cylinder comprising right and left-handed threads therein leaving rhomboid shaped elevations between the threads, a flattening of the point of the outer rhomboid shaped elevations at each end of the threaded portion of the cylinder at the point where the threads of opposite slope meet and join each other, whereby when the follower passes through the threads it may gradually change its direction from one thread to the other by being slid along such flattened surface as it passes from one thread to the other, in combination with a shaft to be reciprocated, an appropriate ribbed follower connected thereto, bearings and supports for the said cylinder and the said reciprocating shaft, a guide for preventing the rotation, while permitting the reciprocation of the said reciprocating shaft, and springs for absorbing the momentum of the reciprocating shaft at the end of each stroke and imparting the energy thus absorbed to the shaft at the beginning of the stroke in the opposite direction, substantially as illustrated.

Signed at the city of New Rochelle, in the county of Westchester and State of New York, this 6th day of June, A. D. 1921.

PATRICK J. ROONEY.